United States Patent [19]

Fischer et al.

[11] Patent Number: 5,317,561
[45] Date of Patent: May 31, 1994

[54] METHOD FOR SWITCHING ATM MESSAGE CELL STREAMS HAVING A HIGH BIT RATE VIA A SWITCHING EQUIPMENT HAVING A LOWER BIT RATE

[75] Inventors: Wolfgang Fischer, Germering; Juergen Storm, Puchheim, both of Fed. Rep. of Germany

[73] Assignee: Siemens Aktiengesellschaft, Munich, Fed. Rep. of Germany

[21] Appl. No.: 880,188

[22] Filed: May 5, 1992

[30] Foreign Application Priority Data

May 7, 1991 [EP] European Pat. Off. ........ 91107434.2

[51] Int. Cl.$^5$ .............................................. H04L 1/22
[52] U.S. Cl. ....................................... 370/16; 370/13; 370/60.10; 371/8.2
[58] Field of Search ....................... 370/94.1, 60, 60.1, 370/112, 16, 16.1, 13, 58.1-58.3; 371/11.1, 11.2, 8.1, 8.2

[56] References Cited

U.S. PATENT DOCUMENTS

| | | | |
|---|---|---|---|
| 3,886,318 | 5/1975 | Charransd et al. | 371/8.2 |
| 4,991,171 | 2/1991 | Teraslinna et al. | 370/94.1 |
| 5,014,261 | 5/1991 | Shinbashi et al. | 370/16 |
| 5,062,106 | 10/1991 | Yamazaki et al. | 370/94.1 |
| 5,099,475 | 3/1992 | Kozaki et al. | 370/60 |
| 5,109,378 | 4/1992 | Proctor et al. | 370/60 |
| 5,200,950 | 4/1993 | Foglar et al. | 370/16 |

FOREIGN PATENT DOCUMENTS

| | | |
|---|---|---|
| 0279443 | 8/1988 | European Pat. Off. . |
| 0384936 | 9/1990 | European Pat. Off. . |
| 0453606 | 10/1991 | European Pat. Off. . |
| 0453607 | 10/1991 | European Pat. Off. . |
| WO86/02511 | 4/1986 | PCT Int'l Appl. . |

OTHER PUBLICATIONS

International Switching Symposium 1990 Proceedings, "Innovations in Switching Technology", Stockholm, Sweden, May 28–Jun. 1, 1990, vol. 5, Session A7, Paper #1, pp. 1–8.

"A Switching Exchange for an Asynchronous Time Division Based Network" by M. De Prycker, IEEE International Conference On Communications, Jun. 7–10, 1987, pp. 774–781.

"A Modular Architecture for Very Large Packet Switches", by T. T. Lee, IEEE Global Telecommunications Conference, Nov. 27–30, 1989, pp. 1801–1809.

"Multipath Interconnection: A Technique for Reducing Congestion Within Fast Packet Switching Fabrics":, by Gary J. Anido et al, IEEE Journal on Selected Areas in Communications, Dec. 6, 1988, No. 9, New York, pp. 1480–1488.

"Considerations on ATM Switching Techniques" by Lutz, International Journal of Digital & Analog Cabled Systems, vol. 1, Nov. 8, 1988, pp. 237–243.

"Flexibles ATM Koppelfeldkonzept fur Die Breitbandkommunikation" by Dietrich Bottle, (1990) pp. 810–815.

"A Scalable ATM Switching System Architecture" by Lutz, IEEE Journal on Selected Areas in Communications, vol. 9, No. 8, Oct. 1991, pp. 1299–1307.

*Primary Examiner*—Douglas W. Olms
*Assistant Examiner*—Chau T. Nguyen
*Attorney, Agent, or Firm*—Hill, Steadman & Simpson

[57] ABSTRACT

In switching equipment, message cells of a message cell stream that has a transport bit rate higher by a multiple than the transmission bit rate of switching elements of the switching equipment are distributed over a plurality of switching network inputs corresponding in number to the multiple. The message cells have information attached to them that indicates all modules via which the respective message cells are through-connected to a respective output of the switching network.

8 Claims, 3 Drawing Sheets

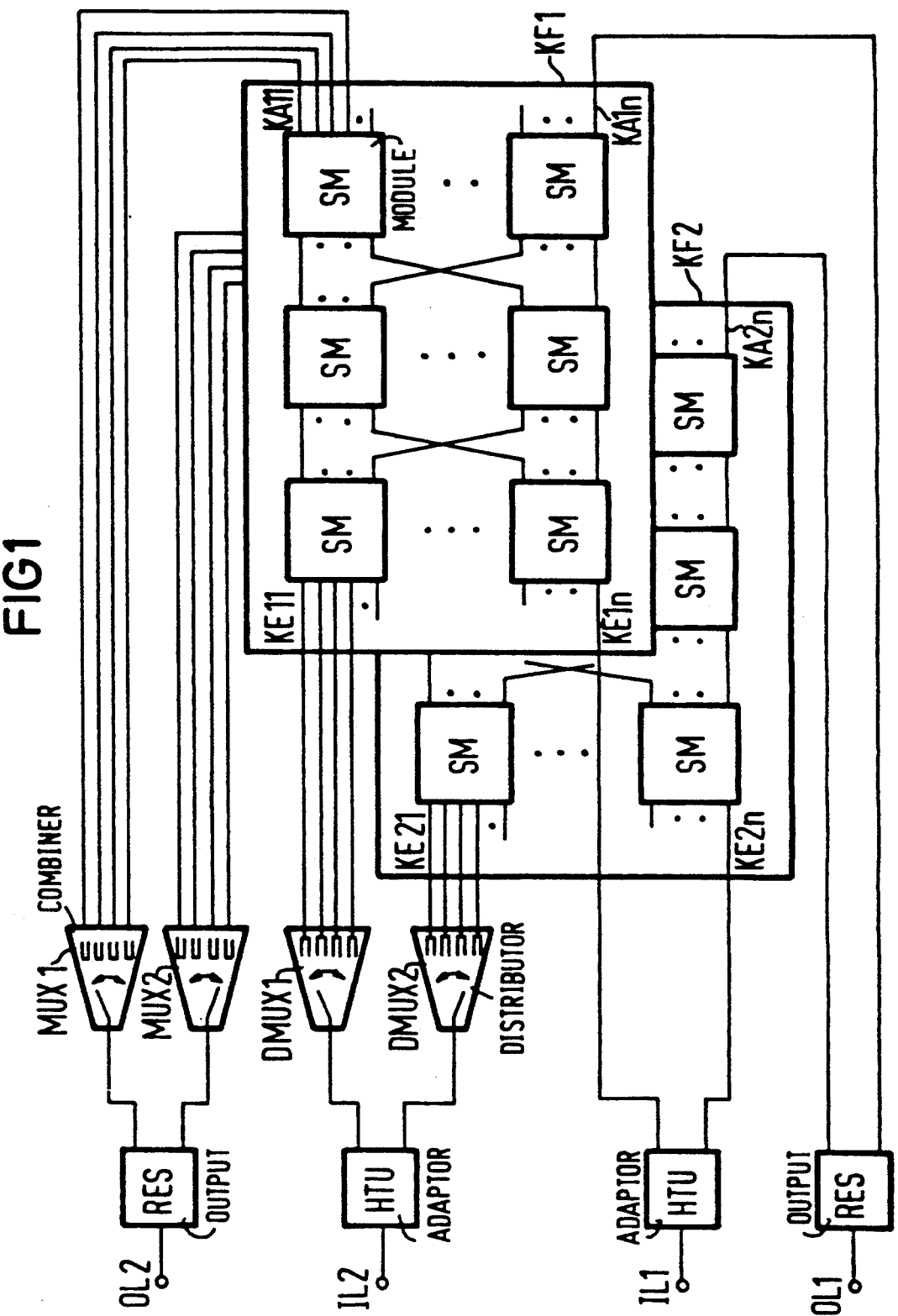

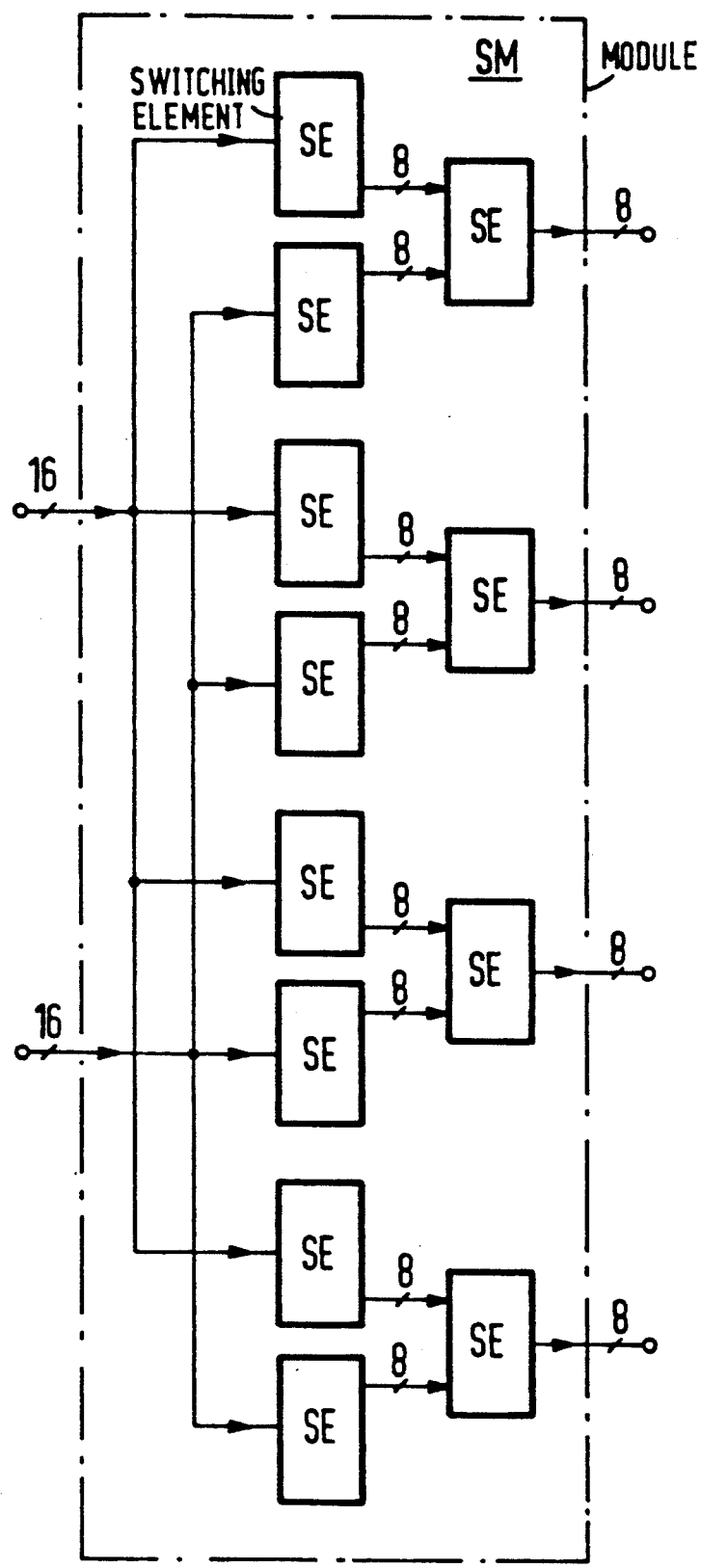

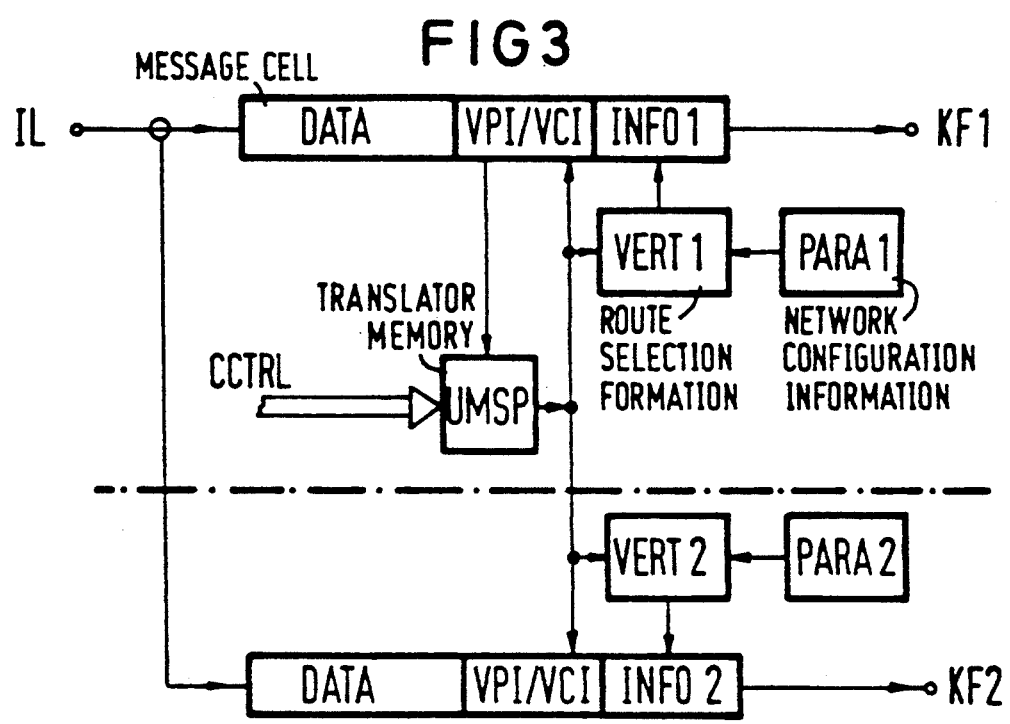

METHOD FOR SWITCHING ATM MESSAGE CELL STREAMS HAVING A HIGH BIT RATE VIA A SWITCHING EQUIPMENT HAVING A LOWER BIT RATE

BACKGROUND OF THE INVENTION

The transmission bit rate in switching equipment is technologically limited by the switching speed of the switching elements utilized in the switching equipment, whereas higher transmission bit rates are definitely possible on the links between the switching equipment.

An article in the reference Nachrichtentechnische Zeitschrift, Vol. 43 (1990), No. 11, pages 810–815 discloses a switching network for switching message cells that are transmitted according to the ATM (asynchronous transfer mode) principle.

Given this modularly structured switching network, the modules are connected to one another via connecting lines or links on which the transmission bit rate is four times higher than in the switching elements of the modules. Further, the message cells in this switching network are respectively subdivided into segments and provided with destination information that describes the switching network output to which the respective message cell should proceed. On the basis of this destination information, the output to be used and, thus, further path to the next switching element in the next stage of the switching network, is individually defined in every switching element for every message cell. Given what is thus referred to as "self-routing switching network", the destination information carried along by every message cell is interpreted in every switching element of the switching network. As a result every message cell, so to speak, itself seeks its route to the appertaining switching network output. In addition to incurring the outlay for interpreting the destination information to be undertaken in every switching element, this switching network design also requires a constant availability of information about the current switching network configuration in the switching elements, resulting in a relatively high complexity of the switching elements.

The present invention resolves the problem of avoiding the aforementioned disadvantages.

SUMMARY OF THE INVENTION

This problem is resolved by a method for switching message cells of a transmission system transporting a message cell stream according to an asynchronous transfer mode via a switching network constructed with modules. The transport bit rate of the transmission system is a multiple of the transmission bit rate of the switching elements of the modules. The message cells are distributed onto a plurality of switching network inputs corresponding in number to the multiple upon respective addition of information that indicates all modules via which the respective message cells are to be through-connected to a respective output of the switching network. As a result the message cells are through-connected to the appertaining outputs via the modules designated in this manner and are again combined to form the message cell stream proceeding from the outputs.

The present invention provides the advantages that nonuniform load distributions at the switching network inputs and overload phenomena caused by message cell arrivals following one another at brief time intervals are avoided, whereby the switching elements of the switching network themselves need not have any information about the current switching network configuration available to them. It should be cited as a further advantage that information that define a defined path through the switching network can be attached to the message cells, individual switching elements being directly selectable with this information. The connections having a low transmission bit rate and fixed through-connect route, for example connections for control or testing purposes, can be switched simultaneously with connections whose message cells are through-connected across the switching network via different routes.

In a further development, the message cells are cyclically distributed over the switching network inputs. This message yields a simple and uniform distribution of message cells.

In a further development, the message cells that must be through-connected over a plurality of modules and that can be through-connected over different modules have information connected to them that indicates different paths over different modules for successive message cells.

A broad scatter of message cells that cannot be switched via short paths is achieved over a great number of routes through the switching network on the basis of this measure. As a result waiting times are greatly reduced at the output of the first stage of the switching network.

In a further development, the distribution of message cells occurs separately for each level of redundant switching network matrices. In the case of a different configuration of the switching network matrices caused by a fault or a reconfiguration of the redundant switching network matrices, this measure yields an increased through-connect capability of the switching network.

In a further development, the message cells of a message cell stream that has a transport bit rate that does not exceed the transmission bit rate of the switching elements have respective information attached to them that indicates all modules via which the respective message cells are through-connected to a respective switching network output. This message cell stream is assigned to a switching network input and the message cells are through-connected to the appertaining output via the modules designated in this manner.

The through-connect of both message cell streams having a transport bit rate that is higher than the transmission bit rate of the switching elements of the switching network, as well as, of message cell streams having a transport bit rate that is lower than or equal to the transmission bit rate of the switching elements of the switching network is enabled by this measure.

In a further development, the message cells have a cyclically continuous sequence number attached to them in call-associated fashion before being through-connected through the switching network. The sequence of the message cells for every connection are assured on the basis of this sequence number. Overtaking events of message cells that are caused by the distribution principle or by the through-connection via redundant switching network matrices are reversed by this measure.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a block circuit diagram of a circuit arrangement wherein the method of the present invention is realized;

FIG. 2 depicts an arrangement of switching elements in a module referenced SM in FIG. 1; and FIG. 3 illustrates details of the block referenced HTU in FIG. 1.

DESCRIPTION OF THE PREFERRED EMBODIMENT

FIG. 1 shows switching equipment for through-connecting message cells transmitted according to an asynchronous transfer mode. The switching equipment comprises a switching network formed with two switching network matrices KF1, KF2 that are redundant relative to one another. The inputs of the switching network are established by the inputs of the switching network matrices KE11 ... KE1n, KE21 ... KE2n and the outputs of the switching network are established by the outputs of the switching network matrices KA11 .. . KA1n, KA21 ... KA2n. The switching network matrices each respectively have a three-stage, non-convoluted structure formed by a plurality of modules SM. The inputs and outputs of the switching network are connected to inputs or, respectively, outputs of modules. A message cell supplied to an input of a switching network matrix can generally be through-connected to a specific output of the switching network level via different modules and, thus, via different routes.

FIG. 2 shows further details of a module known from IEEE Journal on Selected Areas in communications, vol. 9, No. 8, October 1991, received Jan. 24, 1991. The module has 32 input lines that are combined to form two line bundles each having respectively 16 lines, and has 32 output lines that are combined in line bundles each having respectively 8 lines. The modules are formed by 12 switching elements SE that each respectively have 16 inputs and 8 outputs. The internal structure of the switching elements SE allows a through-connection of message cells from every input to every output. The internal structure of the switching elements is known, for example, from FIG. 3 in the above-recited IEEE Journal reference or from "International Journal of Digital and Analog Cabled System", Vol. 1, 1988, pages 237–248, FIG. 6, and therefore need not be set forth in greater detail here. The switching elements effect the actual through-connection of the message cells on the bit level. The switching elements have a maximum transmission rate that is determined by the technology being employed therein; let this be 150 Mbit/s in the exemplary embodiment. The switching elements of the module are interconnected according to FIG. 2 such that every input line of the module can be through-connected to every output line of the module.

The description now returns to FIG. 1. A message cell stream whose transport bit rate does not exceed the transmission bit rate of the switching elements is supplied via an adaptation means HTU to the switching network KF via an offering trunk IL1. In the example, let this message cell stream be through-connected to the serving trunk OL1 via the switching network and via an output means RES.

A message cell stream that has a transport bit rate in the example that exceeds the transmission bit rate of the switching elements four-fold is supplied to an adaptation means HTU via an offering trunk IL2. From this adaptation means, the message cells transmitted by this message cell stream are supplied to a distributor means DMUX1, DMUX2 formed by a demultiplexer in the exemplary embodiment. In the distributor means, the message cells are distributed onto a plurality of switching network inputs, whereby the plurality is dimensioned such that the sum of the transmission bit rates of the switching network inputs at least corresponds to the transport bit rate of the cell stream. When, for example, the message cell stream has a transport bit rate of 600 Mbit/s and every switching network input has a transmission bit rate of 150 Mbit/s, the message cells of the transmission system are thus distributed onto at least four switching network inputs. The distribution of message cells can thereby advantageously occur cyclically.

The distributor means can be fashioned in a manner at the command of a person skilled in the art. For matching the higher transport bit rate on the offering trunk to the transmission bit rate in the switching elements of the modules that is lower in comparison thereto, an intermediate memory fashioned, for example, as a FIFO memory can be provided (as indicated in DMUX) for every link between the distributor means DMUX1, DMUX2 and the switching network.

A plurality of output lines of the switching network that is equal to the plurality of input lines and onto which the message cells of a message cell stream are distributed is connected to a combining means MUX1, MUX2. In this combining means, the message cells incoming from these output lines are combined to form a message cell stream. Thus, when the respective transmission bit rate of the output lines of the switching network that are connected to a combining means is 150 Mbit/s and the transport bit rate of the transmission system amounts to 600 Mbit/s, then four switching network output lines are combined into one transmission system in the combining means. For matching the lower transport bit rate in the switching elements of the modules to the transport bit rate on the serving trunk that is higher in comparison thereto, intermediate memories that can be fashioned as FIFO memories are provided, as indicated in the combining means. The realization of such a combining means is within the command of a person skilled in the art and therefore need not be set forth in greater detail. The combining means NUX1, MUX2 is connected to a serving trunk OL2 via an output means RES. The output RES means has the job of assuring the sequence of the message cells of the message cell stream. An intermediate storage of the message cells is required for assuring the sequence of the message cells of the message cell stream, resulting in a uniting of the combining means MUX1, MUX2 with the output means RES. Equipment for assuring the message cell sequence is known, for example, from European reference EP-A-89103798.8 (corresponding to U.S. Ser. No. 487,220, now abandoned, filed Mar. 1, 1990 assigned to the same assignee as the present application and therefore need not be set forth in greater detail here. When the switching equipment is operated with two switching network matrices that are redundant relative to one another, an output means known from IEEE Journal on Selected Areas in Communications, Vol. 9, No. 8, October 1991, and referenced RPCU therein or methods disclosed by European reference EP-A-90108054.9 or EP-A-90108055.6 (corresponding to U.S. Ser. No. 678,046 filed Apr. 1, 1991 and now U.S. Pat. No. 5,222,063 issued Jun. 22, 1993 and U.S. Ser. No. 690,360 filed Apr. 24, 1991 now U.S. Pat. No. 5,200,950 issued Apr. 6, 1993, respectively, both of which assigned to the same assignee as the present application and both of which are hereby incorporated by reference) can be utilized.

FIG. 3 shows further details of the adaptation means HTU. The message cells transmitted on the offering trunk which, as known, each respectively have a message cell header having a length of 5 bytes that indicates the appertaining, virtual connection VPI/VCI and a payload data part DATA carrying the payload information and having a length of 48 bytes, are first intermediately stored in the adaptation means HTU. This can be potentially followed by a check of the respective message cell on the basis of information carried along in the message cell header. As indicated by an arrow, the designation VPI/VCI of the virtual connection is supplied to a translator memory UMSP. As illustrated by a broken arrow CCTRL, the translator memory UMSP is also supplied by a central controller means (not shown in detail) with information that describes which switching network outputs are connected to the individual connection directions of the higher-ranking switching network. A new designation VPI/VCI that is relevant for further routing of the appertaining message cell is formed for every connection in the translator memory UMSP on the basis of the designation VPI/VCI that is carried along. The new designation for the appertaining, virtual connection is entered in the message cell header, as indicated by an arrow.

In accordance with the present invention, the message cells of a message cell stream that has a transport bit rate that is higher by a multiple than the transmission bit rate of the switching elements are distributed over a plurality of switching network inputs corresponding in number to this multiple. A means VERT is supplied, first, with information supplied by the translator memory UMSP regarding the output of the switching network to which the respective message cells should be forwarded and, second, with information supplied by a means PARA regarding the momentary configuration of the appertaining switching network level. Information that indicate all routes and, thus, all modules via which the respective switching network outputs can be reached are deposited in the means VERT. Information regarding which modules are out at the moment is also deposited in the means PARA, and as a result no message cells can be routed via these modules. On the basis of the information supplied by the translator memory and by the means PARA and on the basis of the information deposited in the means VERT, the means VERT selects a route that leads to the desired switching network output. The means VERT forms information INFO that indicates all modules via which the respective message cell should be forwarded to reach a respective output of the switching network. This information INFO is placed in front of a respectively handled message cell. The message cells are supplied to a respective input of the switching network, whereby the message cells of the message cell stream are distributed by the distributor means onto the appertaining inputs of the switching network when a message cell stream having a higher bit rate than the transmission bit rate of the switching network elements is through-connected. From the switching network inputs, the message cells are then through-connected to the appertaining switching network outputs via all modules designated in the appertaining information INFO.

It can be provided in a further development that the message cells of a message cell stream are through-connected optimally broadly scattered over the modules of the switching network according to the information INFO. Given a multi-stage switching network arrangement, for example, the message cells of a message cell stream can thus be distributed pseudo-randomly over all modules of the second stage of the switching network via which they reach the appertaining switching network output. What is achieved by this measure is that blocking is largely avoided in the first stage of the switching network and overload phenomena in the switching network is avoided.

When the distribution of message cells in a switching network having redundant switching network matrices is undertaken via a single distributor means, then, given outage of a module in one of the switching network matrices, the corresponding module of the redundant switching network matrix is also by-passed in the further through-connection of message cells. The call handling capacity of the switching equipment being thus limited to a greater extent than necessary. When a switching network having redundant switching network matrices is utilized, it can be provided in a further development that the distribution of message cells occurs separately for every switching network matrix. What is achieved by this measure is that the distribution of message cells can occur independently of the respective structure of the redundant switching network matrices. A difference in the structure of redundant switching network matrices, for example, can occur when one module fails in one of the switching network matrices. A difference in the structure of redundant switching network matrices can also be established when (during the course of a reconfiguration of an operating switching network having redundant switching network matrices) the redundant switching network matrices are respectively successively replaced by switching network matrices having an altered structure.

Thus, in the case of a switching-network-level-associated distribution, the message cells are through-connected to the appertaining switching network output via the momentary structure of the switching network matrix according to the information on hand for the respective switching network matrix in the appertaining means PARA1, PARA2.

Means for a separate distribution over redundant switching network matrices are shown under a dot-dash line in FIG. 3. A copy of every message cell incoming on the offering trunk IL is written into a further intermediate memory. The same, new designation of the virtual connection as in the message cell header of the message cell to be through-connected via the switching network matrix KF1 is entered into the message cell header VPI/VCI of the message cell to be through-connected over the switching network matrix KF2. An information INFO2 that can deviate from the information INFO1 is now formed in the means VER2 using the new designation of the virtual connection supplied by the translator memory and using the information about the current structure of the redundant switching network matrix KF2 available in the means PARA2. The information INFO2 formed individually associated to message cells and that indicates all modules via which the appertaining message cell is to be through-connected is attached to the message cell now being handled, whereupon the message cell is through-connected to the appertaining switching network output via the redundant switching network matrix KF2 according to the information INFO2.

As may be seen from FIG. 1, the switching network outputs to which the message cells of a message cell stream that has a higher transport bit rate than the transmission bit rate of the switching elements of the switching network, are recombined into a message cell stream using a combining means MUX.

Different transit times of message cells as a result whereof overtaking of message cells cannot be excluded can arise due to the through-connection of message cells of one virtual connection through the switching network over different routes. A function of the output means RES is to assure the sequence of message cells. This can occur in a known way (see European references EP-A90108054.9, EP-A-90108055.6) in that a cyclically continuous sequence number is call-individually attached to the message cells in the adaptation means, with reference whereto the sequence of message cells is call-individually assured. A further function of the output means is to remove the information INFO used within the switching equipment and, potentially, the sequence number from the message cells. From the output means, the message cells are forwarded onto the respective serving trunk OL connected to the output means.

The present invention has been set forth here only with reference to a distribution of message cell streams, having a higher transport bit rate than the transmission bit rate of the switching elements of the switching network, over a plurality of inputs of a switching network level. Let it be pointed out that the distribution of message cells of a message cell stream can also occur without limitation onto the switching network inputs of switching network matrices that reside in parallel structure relative to one another.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for switching message cells of a message cell stream of a transmission system that transports the message cell stream according to an asynchronous transfer mode across a switching network having modules, each of the modules having switching elements, comprising the steps of: providing the switching network with a plurality of redundant switching network matrices, each of said redundant switching network matrices having modules; for a transport bit rate of the transmission system that is a multiple of a transmission bit rate of the switching elements, distributing the message cells of the message cell stream over a plurality of switching network inputs of the switching network that corresponds in number to said multiple of the transmission bit rate of the switching elements, the message cells being separately distributed for each switching network matrix of the plurality of redundant switching network matrices; adding to the message cells information that indicates all modules via which respective message cells are through-connected to a respective switching network output of a plurality of switching network outputs of the switching network, message cells that are through-connected via a plurality of modules and that are through-connected via different modules having information attached to them that designate different routes via different modules for successive message cells, and given outage of a down module, the message cells being only provided with information that respectively indicates a route through the switching network that by-passes the down module; call-individually attaching a cyclically continuous sequence number to the message cells of the message cell stream, a sequence of the message cells in the message cell stream being assured on the basis of the sequence number when the message cells are recombined to form the message cell stream; through-connecting the message cells to the appertaining outputs via respectively indicated modules; and recombining the message cells to form the message cell stream.

2. The method according to claim 1, wherein, in the step of distributing the message cells, the message cells are cyclically distributed onto the switching network inputs.

3. The method according to claim 1, wherein, in addition to the steps associated with a transport bit rate that is a multiple of the transmission bit rate of the switching element, the method further comprises the steps of: for message cells of a further message cell stream that has a transport bit rate that does not exceed the transmission bit rate of the switching elements, respectively attaching information to the message cells that indicate all modules via which respective message cells are to be through-connected to a respective switching network output; applying the further message cell stream to a switching network input; and through-connecting the message cells of the further message cell stream to an appertaining output via the respectively indicated modules.

4. A method for switching message cells of a message cell stream of a transmission system that transports the message cell stream according to an asynchronous transfer mode across a switching network having a plurality of modules, each of the modules having switching elements, comprising the steps of: providing the switching network with a plurality of redundant switching network matrices, each of said redundant switching network matrices having modules; for a transport bit rate of the transmission system that is a multiple of a transmission bit rate of the switching elements, distributing the message cells of the message cell stream over a plurality of switching network inputs of the switching network that corresponds in number to said multiple of the transmission bit rate of the switching elements, the message cells being separately distributed for each switching network matrix of the plurality of redundant switching network matrices; adding to each of the message cells information that indicates selected modules of the plurality of modules via which respective message cells are through-connected to a respective switching network output of a plurality of switching network outputs of the switching network, the information attached to the message cells designating different routes via different selected modules for successive message cells, and given outage of a down module, the message cells being only provided with information that respectively indicates a route through the switching network that by-passes the down module; call-individually attaching a cyclically continuous sequence number to the message cells of the message cell stream, a sequence of the message cells in the message cell stream being assured on the basis of the sequence number when the message cells are recombined to form the message cell stream; through-connecting the message cells to the appertaining outputs via respectively indicated modules; and recombining the message cells to form the message cell stream.

5. The method according to claim 4, wherein, in the step of distributing the message cells, the message cells are cyclically distributed into the switching network inputs.

6. A method for switching message cells of message cell streams of a transmission system that transports the message cell streams according to an asynchronous transfer mode across a switching network having modules, each of the modules having switching elements, comprising the steps of: providing the switching network with a plurality of redundant switching network matrices, each of said redundant switching network matrices having modules; for message cells of a first message cell stream that has a transport bit rate that is a multiple of a transmission bit rate of the switching elements, distributing the message cells of the message cell stream over a plurality of switching network inputs of the switching network that corresponds in number to said multiple of the transmission bit rate of the switching elements; adding to the message cells information that indicates all modules via which respective message cells are through-connected to a respective switching network output of a plurality of switching network outputs of the switching network, message cells of the first message cell stream that are through-connected via a plurality of modules and that are through-connected via different modules having information attached to them that designate different routes via different modules for successive message cells of the first message cell stream; connection-individually attaching cyclically continuous sequence numbers to respective message cells of the first message cell stream, a sequence of the message cells of each connection being assured on the basis of the sequence numbers when the message cells are recombined to form a respective new first message cell stream; through-connecting the message cells of the first message stream to the appertaining outputs via the respectively indicated modules; and recombining the through-connected message cells of the first message cell stream to form a new first message cell stream; for message cells of a second message cell stream that has a transport bit rate that does not exceed the transmission bit rate of the switching elements, respectively adding information to the message cells that indicate all modules via which respective message cells are through-connected to a respective switching network output, message cells of the second message cell stream that are through-connected via a plurality of modules and that are through-connected via different modules having information attached to them that designate different routes via different modules for successive message cells of the second message cell stream; connection-individually attaching cyclically continuous sequence numbers to respective message cells of the second message cell stream, a sequence of the message cells of each connection being assured on the basis of the sequence numbers when the message cells are recombined to form a respective new second message cell stream; applying the second message cell stream to a switching network input; through-connecting the message cells of the second message cell stream to an appertaining output via the respectively indicated modules; and recombining the through-connected message cells of the second message cell stream to form a new second message cell stream; wherein the first and second message cell streams are switched via the plurality of redundant switching network matrices and wherein the message cells of the first message cell stream are separately distributed for each switching network matrix of the plurality of redundant switching network matrices.

7. The method according to claim 6, wherein, in the step of distributing the message cells of the first message cell, the message cells of the first message cell are cyclically distributed onto the switching network inputs.

8. The method according to claim 6, wherein given outage of a down module and in each of the steps of adding information, the message cells only have information attached that respectively indicates a route through the switching network that by-passes the down module.

* * * * *